United States Patent [19]

Glaser et al.

[11] Patent Number: 5,652,820

[45] Date of Patent: Jul. 29, 1997

[54] FIBER OPTIC SPLICE CLOSURE AND PROTECTION APPARATUS

[75] Inventors: James Albert Glaser, Bonham; Ronald William Glaser, Ector; Daniel R. Glaser, Bonham; Justin R. Minchey, Leonard, all of Tex.

[73] Assignee: ACT Communications, Inc., Ector, Tex.

[21] Appl. No.: 556,536

[22] Filed: Nov. 13, 1995

[51] Int. Cl.$^6$ ........................................ G02B 6/36
[52] U.S. Cl. ................................ 385/135; 385/134
[58] Field of Search ............................. 385/134–139, 385/147

[56] References Cited

U.S. PATENT DOCUMENTS

| | | | |
|---|---|---|---|
| 3,668,640 | 6/1972 | Driscoll | 340/825 |
| 4,259,542 | 3/1981 | Tehan et al. | 174/48 |
| 4,262,317 | 4/1981 | Baumbach | 361/124 |
| 4,410,850 | 10/1983 | Pesto et al. | 324/519 |
| 4,434,396 | 2/1984 | Montague | 323/230 |
| 4,554,401 | 11/1985 | Ball | 174/37 |
| 4,554,608 | 11/1985 | Block | 361/119 |
| 4,740,859 | 4/1988 | Little | 361/56 |
| 4,743,997 | 5/1988 | Carpenter, Jr. | 361/118 |
| 4,760,485 | 7/1988 | Ari et al. | 361/54 |
| 4,802,055 | 1/1989 | Beckerman | 361/56 |
| 4,861,134 | 8/1989 | Aloameel et al. | 385/135 |
| 4,870,534 | 9/1989 | Hartford | 361/58 |
| 4,903,161 | 2/1990 | Huber et al. | 361/56 |
| 5,007,701 | 4/1991 | Roberts | 385/53 |
| 5,053,910 | 10/1991 | Goldstein | 361/111 |
| 5,090,792 | 2/1992 | Koht et al. | 385/135 X |
| 5,101,180 | 3/1992 | Frey | 333/12 |
| 5,148,133 | 9/1992 | Zennamo, Jr. et al. | 333/175 |
| 5,198,775 | 3/1993 | Bussinger et al. | 324/544 |
| 5,224,878 | 7/1993 | Lurie et al. | 439/620 |
| 5,265,187 | 11/1993 | Morin et al. | 385/135 |
| 5,440,666 | 8/1995 | Burek et al. | 385/135 |

OTHER PUBLICATIONS

Date Nov., 1988 Title "700 Universal Splice Closure" Section 700–100, ACT Practice Author(s) ACT Communications, Inc. No. Pages 11.

Date Jun., 1992 Title ACT 44X Basic Schematic Author(s) ACT Communications, Inc. No. Pages 1.

*Primary Examiner*—John D. Lee
*Attorney, Agent, or Firm*—Winstead Sechrest & Minick P.C.; Gregory W. Carr

[57] ABSTRACT

A fiber optic splice closure permits grounding a fiber optic backbone cable but allows for propagation of cable-locating signals along the full length of the backbone cable and along fiber optic spur cables spliced to the backbone cable in the closure. An electrically conductive sheath of the backbone cable is coupled to ground through a surge protector and through a resistor to a conductive member of each spur cable. The terminating end of the spur cable is hard grounded at the customer site. The surge protector and resistor are mounted outside a sealed splice chamber of the closure.

21 Claims, 5 Drawing Sheets

FIBER OPTIC SPLICE CLOSURE AND PROTECTION APPARATUS

FIELD OF INVENTION

The invention relates generally to fiber optic communications cable systems, and more particularly to splice closures and methods for grounding fiber optic cables.

BACKGROUND OF THE INVENTION

Fiber optic cables have become widely used in the communications industry as a means to communicate massive amounts of information. A fiber optic cable has a very high bandwidth, as compared with conventional transmission lines such as copper wire. A relatively small cable is capable of transmitting large amounts of information. Fiber optic cables are thus very desirable for use in densely populated metropolitan areas. Fiber optic cable is typically installed in metropolitan areas by burying a three to four mile "loop" or "fiber ring" that extends from a "central office" around a highly populated area. A high fiber count cable, referred to as a "backbone," is used for the fiber ring. Along the ring, smaller fiber optic cables, referred to as "customer drops" or "spurs," are spliced to fibers in the backbone and run to "termination sites" or buildings of customers.

Splicing of a fiber optic customer drop cable to a fiber optic backbone cable is made in an underground vault or manhole. The task of splicing requires much labor and time. Each optical fiber in the customer drop must be individually fused or mechanically connected to an optical fiber in the backbone cable. The splice then must be sealed within a water-tight enclosure commonly referred to as a splice closure.

One widely used type of splice closure utilizes a tubular, plastic housing sealed at each end by caps. The interior tubular housing between the caps forms a splice chamber. The closure must have an air-tight seal to prevent entry of water, dust and other contaminants which may potentially damage a fiber optic splice. The end caps typically take the form of a "duct closure" or seal. A duct seal is formed of a resilient, compressible, disc-shaped material, such as rubber or polyurethane. Two plates located on opposite sides of the material compress the material, causing it to expand radially and, consequently, to snugly engage the inner walls of the tubular housing. The seals include holes and slots through which the fiber optic backbone extends to enter the enclosure. These holes and slots are sealed by the expansion of the resilient material during compression. The duct seal has the advantage of allowing the closure to be reentered and sealed quickly and repeatedly for splicing, servicing and maintenance. To help organize individual optical fibers for splicing, splice "trays" are provided for separating out and holding each individual fiber. These trays are stacked within the closure and held by means of an elongated bracket which extends the length of the tubular housing. The seals are mounted to opposite ends of the bracket. Also mounted to the bracket is a "pull" bracket to which a metallic strength member in the cable is secured to assist in preventing damage to the splice in the event the cable is pulled. Thus, an integrated unit is formed with the end cap seals, brackets and trays. Accessing the closure requires only loosening the compression plates on the seals and sliding the tubular housing off.

It is sometimes necessary to locate a fiber optic cable for repair, replacement or maintenance, to sort it from many other cables which may be present underground, or to mark the ground above the line during periods of construction in the vicinity in order to avoid inadvertently damaging the cable. Most fiber optic cables have either a conductive metallic sheath or tracer wire embedded in the cable which enables a low frequency, electrical signal, called a "tone," to be transmitted from the central office. The sheath or tracer wire cable acts, in essence, like a very large antenna. A direction-finding receiver is used to locate the cable. In order to conduct the tone signal along the cable, the sheath of the fiber optic cable cannot be grounded at any point except at a terminating end. Otherwise, the signal will not travel the entire length of the cable.

Occasionally, the fiber optic cable must be strung over major roadways and other obstacles. The conductive metallic sheath or tracer wire is thus subject to transient electrical surges induced by lightning, as well as to other types of induced signals such as those caused by electromagnetic fields surrounding high voltage power lines. Electrical surges on the cable can cause damage to equipment connected to the cable, both at the customer end and at the central office. A traditional method for suppressing surges on the cable is to ground the cable by bonding the sheath directly to a ground wire that is attached to a ground rod in each manhole. Transient electrical surges on the sheath thus never reach the customer. Unfortunately, directly grounding the sheath also grounds the cable-locating signal. Locating a cable thus requires the ground to be physically "lifted" or disconnected from the sheath or tracer wire in each of the manholes. Manually lifting the grounds is a laborious, time-consuming task in highly populated areas where there may be splices every few hundred meters.

Another method is to "float" the backbone cable and customer drops. The sheath of the customer drops is bonded to the sheath of the backbone cable. A surge suppressor is installed at the termination site of each customer drop by connecting it between the outer sheath of the cable and a ground bus bar in the building. The surge suppressor conducts when the voltage on the cable exceeds a predetermined voltage, pulling the sheath to ground. Otherwise, it behaves like a capacitor which passes high frequency signals to ground but blocks direct current and low frequency signals, including cable-locating signals. A resistor is also placed in parallel with the surge suppressor, between the cable and ground, to create an impedance with respect to periodic signals such as the cable-locating signal. A small amount of the power of the cable-locating signal travels up the customer drop, with the remaining power propagating down the backbone.

This second method has two drawbacks. First, it permits transient electrical surges to travel to the user's premise before being grounded. Generally, it is preferable to keep transient electrical surges as far away from the protected equipment as possible. Some municipal building codes also require that all fiber optic cables be grounded in the manhole. Second, it requires installation of a surge suppressor at each termination site, thus increasing installation time and cost.

SUMMARY OF THE INVENTION

A fiber optic closure according to the invention not only provides an enclosure for splicing a fiber optic customer drop to a fiber optic backbone cable, but also provides means for grounding of transient voltage surges on the fiber optic backbone cable and on each fiber optic customer drop in an underground vault, rather than at a customer site, while permitting the propagation of cable-locating signals along the fiber optic backbone and up each customer drop.

Furthermore, installation of the closure requires no significant labor or time in addition to the effort normally required for splicing. Thus, a separate surge suppressor need not be installed at each customer site, further reducing the time involved in installing a customer drop and reducing equipment cost.

According to the invention, a surge suppressor and an electrical impedance are integrated with a fiber optic cable splice closure. The splice closure includes a sealed splice chamber. A first lead for connection to a conductive member of a fiber optic backbone cable extends from within the sealed chamber to a surge suppressor, which is connected to ground and to one side of the electrical impedance. The other side of the electrical impedance is connected to a second lead which extends into the splice chamber for connection to a conductive member of a fiber optic customer drop cable. The surge suppressor acts as an open circuit with respect to a cable-locating signal on the backbone cable but otherwise grounds high voltage transients. The impedance circuit enables creation of a drop in potential between the backbone cable and the customer drop, which is grounded at its terminating end. A portion of the cable-locating signal is thus able to propagate from the backbone cable, up each customer drop, to ground, while the remaining portion of the cable-locating signal to propagate along the backbone cable. Additional impedance circuits, in parallel with the first impedance circuit, may be included for connection to additional customer drops spliced in the same closure.

These and other aspects of the invention are exemplified by a preferred embodiment of the invention described below with reference to the accompanying drawings.

BRIEF DESCRIPTION OF THE DRAWINGS

In the accompanying drawings.

Like numbers refer to like parts in the drawings and following description.

DETAILED DESCRIPTION OF THE DRAWINGS

Figure 1:
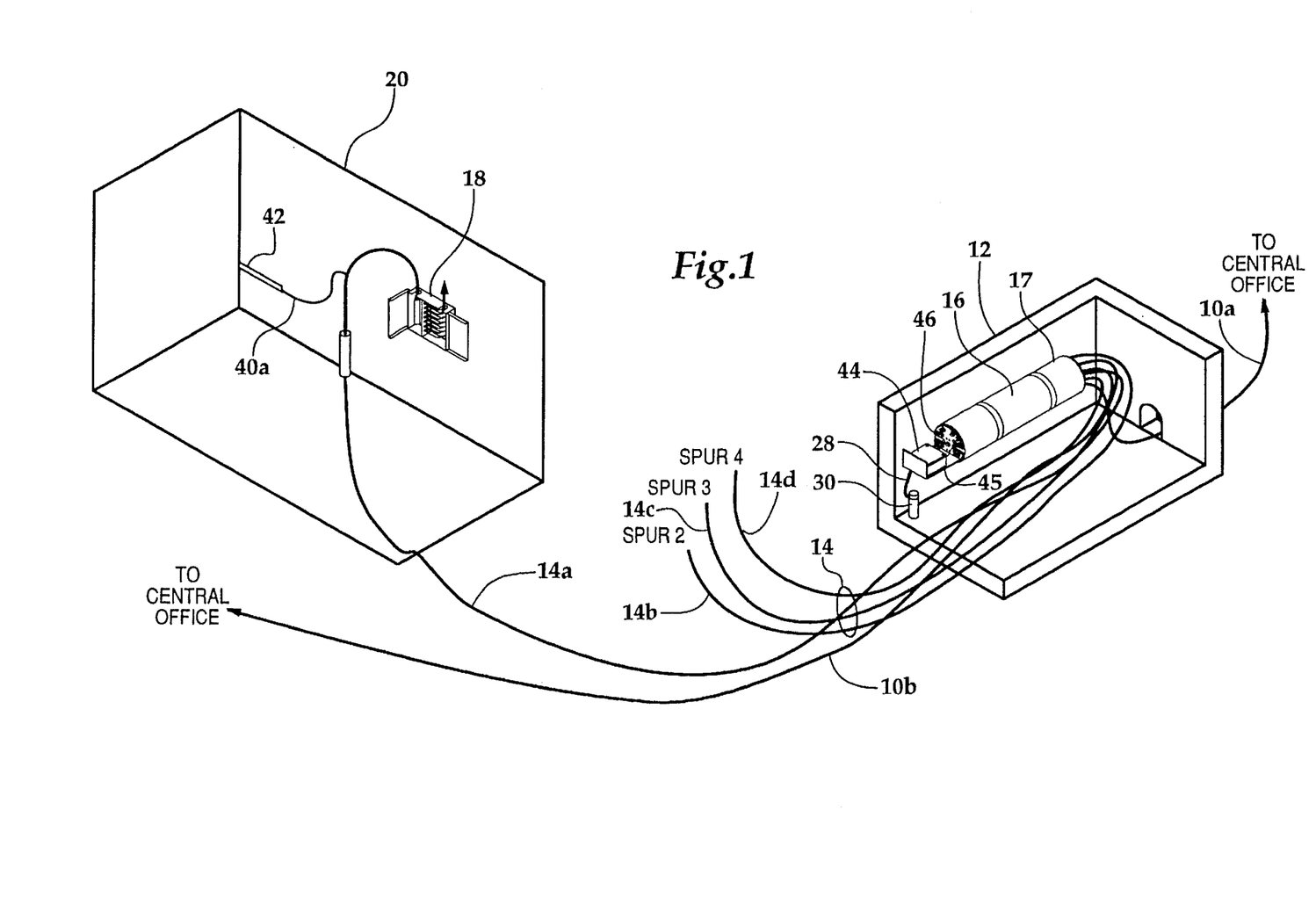
FIG. 1 illustrates one example of a fiber optic cable system for telecommunications in a metropolitan area, having a backbone cable and a plurality of spurs spliced to the cables according to the present invention.

Referring to FIG. 1, one example of a fiber optic cable system for a telecommunications network in a metropolitan area includes a high fiber count backbone cable 10, which starts and terminates at a central office where switching takes place. The backbone cable 10 passes through several underground vaults along its path, such as underground vault 12. In vault 12, one or more fiber optic spur cables or "customer drops" 14 are spliced to the backbone cable within fiber optic splice closure 16. The splice closure includes a housing 17 which, when sealed, forms a water-tight and air-tight splice chamber. The housing, among other things, protects the splices from water, dirt and other deleterious effects of the environment. The splice closure also includes a frame (not seen in FIG. 1) which functions, in part, to relieve strain placed on the splices by the fiber optic cables. The portion of the backbone cable from the central office is referred to as "backbone cable 10a," and the portion leading back to the central office is referred to as "backbone cable 10b." One or more optical fibers of each of the spurs 14 is connected to one or more of the optical fibers on either or both portions of the backbone cables 10a and 10b. The opposite or terminating end of each spur is connected to equipment at a customer site. As an example, spur 14a is shown connected to a fiber "break out box" 18 in building 20. The break out box permits each fiber in the spur to be spliced to a fiber of an internal fiber optic cable, which in turn leads to telecommunications equipment. Spurs 14b, 14c and 14d are terminated at other customer sites in a similar manner.

The optical fibers in each cable are organized into bundles and each bundle enclosed within a "buffer tube" (not shown). The backbone cable includes a metallic sheath surrounding a plurality of buffer tubes. Some backbone cables may not have a metallic sheath. However, if it does not have a sheath, the backbone cable will typically have a conductor for transmitting a low frequency electrical signal for use in locating the cable. Backbone cables also include a metal strengthening member (not shown).

Figure 2:
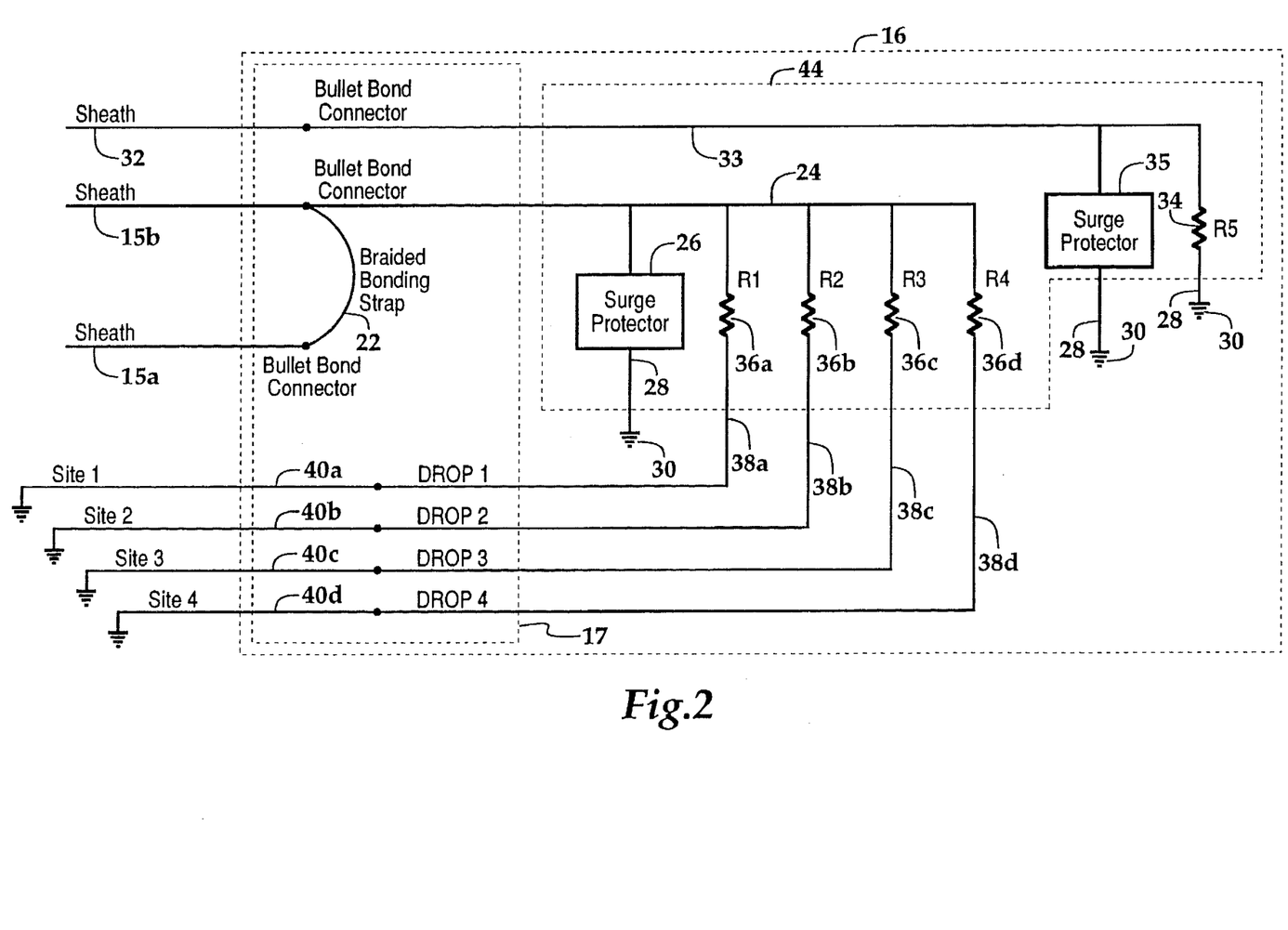
FIG. 2 is an electrical schematic for a splice closure according to the invention.

Referring now to FIGS. 1 and 2 together, within housing 17 of splice closure 16, the sheaths or conductive members 15a and 15b of portions 10a and 10b of the backbone cable are electrically connected by a braided bonding strap 22. Please note that in FIG. 2 the optical fibers of the backbone cable 10 and spurs 14 have been omitted for clarity. Electrically connected to the sheaths 10a and 10b is a first backbone connector lead 24. The first backbone connector lead exits the housing 17 and is electrically connected to one side of surge protector 26. The other side of the surge protector is grounded by connecting it to grounding wire 28, which is in turn connected to a ground rod 30. The surge protector can be a gas tube, a metal oxide varistor (MOV) or a hybrid of a gas tube and MOV. The surge protector functions to create a floating ground on the sheath of the backbone cable 10. The surge protector, when it is not conducting, acts like a capacitor, passing high frequency electrical signals to ground but substantially blocking direct current and low frequency electrical signals. Thus, a low frequency cable-locating signal will propagate along the entire length of the backbone cable, but high voltage transient surges will be discharged to ground.

Although not shown in FIG. 1, some installations may also terminate a backbone cable in a splice closure. Sheath 32 of a terminating backbone cable in FIG. 2 is an example. Its sheath is connected to a second backbone connector lead 33, which exits housing 17. This second backbone connector lead is connected to one side of a second surge protector 35 and to one side of resistor 34. The other side of the second surge protector and the other side of resistor 34 are grounded by the grounding wire 28 connected to ground rod 30. The second surge protector functions like the first surge protector, substantially blocking the flow of cable-locating signals to ground while passing high voltage transient signals.

Electrically connected to first backbone connector lead 24, in parallel with surge protector 26, are parallel resistors 36a, 36b, 36c and 36d. One end of each of drop leads 38a, 38b, 38c and 38d is connected, respectively, to resistors 36a, 36b, 36c and 36d on the side opposite of the backbone connector lead. The opposite, free end of each drop lead 38a, 38b, 38c and 38d is run to the interior of housing 17 where it is electrically connected to, respectively, trace wires 40a, 40b, 40c and 40d. Tracer wires 40a, 40b, 40c and 40d are part of spur cables 14a, 14b, 14c and 14d, respectively, and enable a cable-locating signal to be transmitted along the spur cable. The terminating end of the trace wire is grounded at the customer site. As an example, FIG. 1 shows the terminating end of trace wire 40a connected to a ground bus bar 42 at the customer site. Each resistor functions as an impedance to low frequency electrical signals, such as a cable-locating signal. The impedance creates a drop in potential which allows a small portion of the energy of a cable-locating signal that has been transmitted on the sheath of backbone cable 10 to propagate along a tracer wire of a spur cable to the customer site. Thus, a cable-locating signal transmitted from the central office can propagate along the backbone cable and up each spur that is spliced to the backbone cable without having to lift or disconnect any grounds. Other types of components could be used to create the impedance drop. However, resistors have the advantage that the impedance will not vary with the frequency of the cable-locating signal, thus permitting a range of frequencies to be used for cable locating.

There is no inherent limitation in the number of spurs which the closure can be designed to accommodate. The illustrated configuration of four resistors is for example only. The closure 16 could be configured with additional resistors, to handle more spurs, or fewer resistors, to handle fewer spurs.

The surge protectors 26 and 35 and the resistors 36a and 36b are housed within an electrical enclosure 44, separate from housing 17. The electrical enclosure 44 is mounted, using bracket 45 to end cap 46 of housing 17 on an end of the housing opposite to which fiber optic cables enter. Isolating the electrical components protects the splices from damage in the event a surge protector or resistor fails, causing heat, sparks or an explosion.

Figure 3:
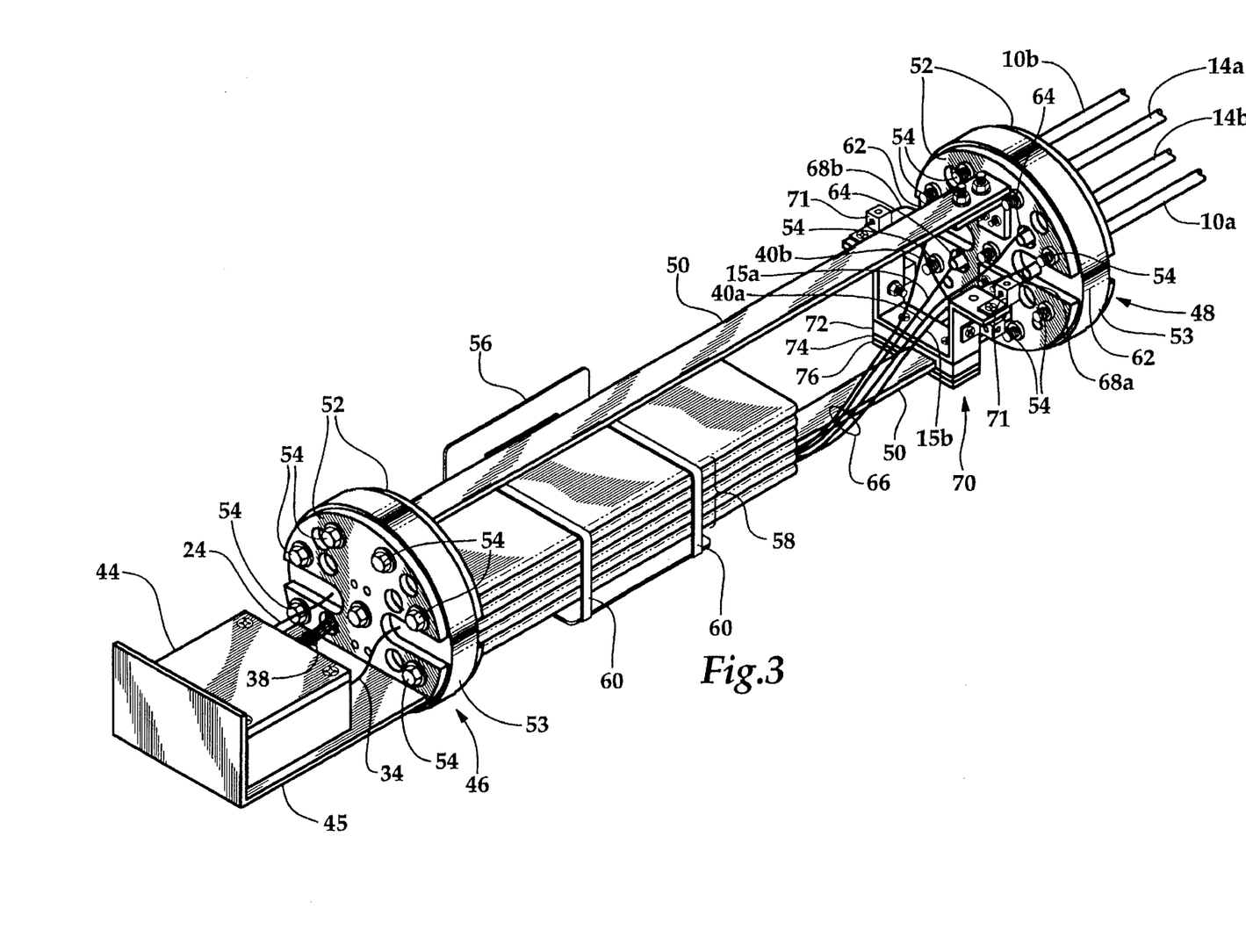
FIG. 3 is a perspective drawing of a splice closure according to the invention with its housing removed.

Referring now to FIG. 3, housing 17 has been removed by loosening end caps 46 and 48 and sliding the housing over both end caps. End caps 46 and 48 are in the form of a duct seal. Each end cap includes a puck-shaped elastomeric member 53 held between two plates 52 by screws 54. Compressing the elastomeric member by tightening screws 54 causes it to expand outwardly, resulting in its outer circumference meeting and snugly fitting against the inside surfaces of tubular housing 17. When the housing is sealed, a sealed splice chamber is formed within the housing between the two seals. Defined within each of the plates 52 are a plurality of holes and slots through which wires and cables may pass. Aligned with these holes and slots are smaller holes 64 and slits 62 formed in the elastomeric member. Tightening of the plates causes the elastomeric member to close the holes and slots, thereby forming a tight seal around any cables or wires which extend through the holes or slots. The end caps are held in fixed relationship by a frame formed by two bars 50. Mounted between the end caps 46 and 48 are splice trays 58, stacked on bracket 56 and held together by bands 60. Bracket 56 is connected to one of the two bars 50. The splice trays, which are well known in the art, facilitate organizing individual fibers in a backbone cable and individual fibers of spur cables for splicing. The slits 62 permit a backbone cable to be spliced even when it is carrying light signals, since it can be easily slid out of the seal without disturbing preexisting splices.

Backbone cables 10a and 10b enter the splice chamber through slits 62. Spur cables 14a and 14b enter the splice chamber through holes 64. Spur cables 14c and 14d have been omitted for clarity. Optical fibers inside the backbone cables and spur cables have also been omitted for clarity. Only electrically conductive members 66 of the backbone and spur cables are shown. These members, which can be metallic sheaths and/or tracer wires, are used to transmit cable-locating signals. The conductive members 15a and 15b of backbone cables 10a and 10b are bonded together and connected to first backbone connector lead 24 according to the electrical schematic of FIG. 2. The tracer wires or conductive members 40a and 40b of spur cables 14a and 14b are connected to drop leads 38a and 38b, respectively, in accordance with the electrical schematic of FIG. 2. Backbone connector leads 24 and 34 and drop leads 38 are passed through end cap 46 when assembling the closure during manufacture so that only a connection of the leads to the conductive members of the respective fiber optic cables using a bullet bond is required during installation of the splice closure.

Strengthening members 68a and 68b of, respectively, backbone cables 10a and 10b, are attached to pull bracket 70. Pull bracket 70 is clamped to one of the two bars 50 using metal plate 76 and two screws. The strengthening member is preferably isolated from the closure, which is grounded. Otherwise, electrical signals transmitted on the backbone cable could also be accidentally grounded. The bracket is electrically isolated from the bar 50 by a layer of dielectric or insulating material interposed between the bracket and the bar. Similarly, metal plate 76 is isolated from the bar by a second plate 74 of dielectric material. The pull bracket is thus electrically isolated from the frame of the splice closure, which is in turn grounded.

Figure 4:
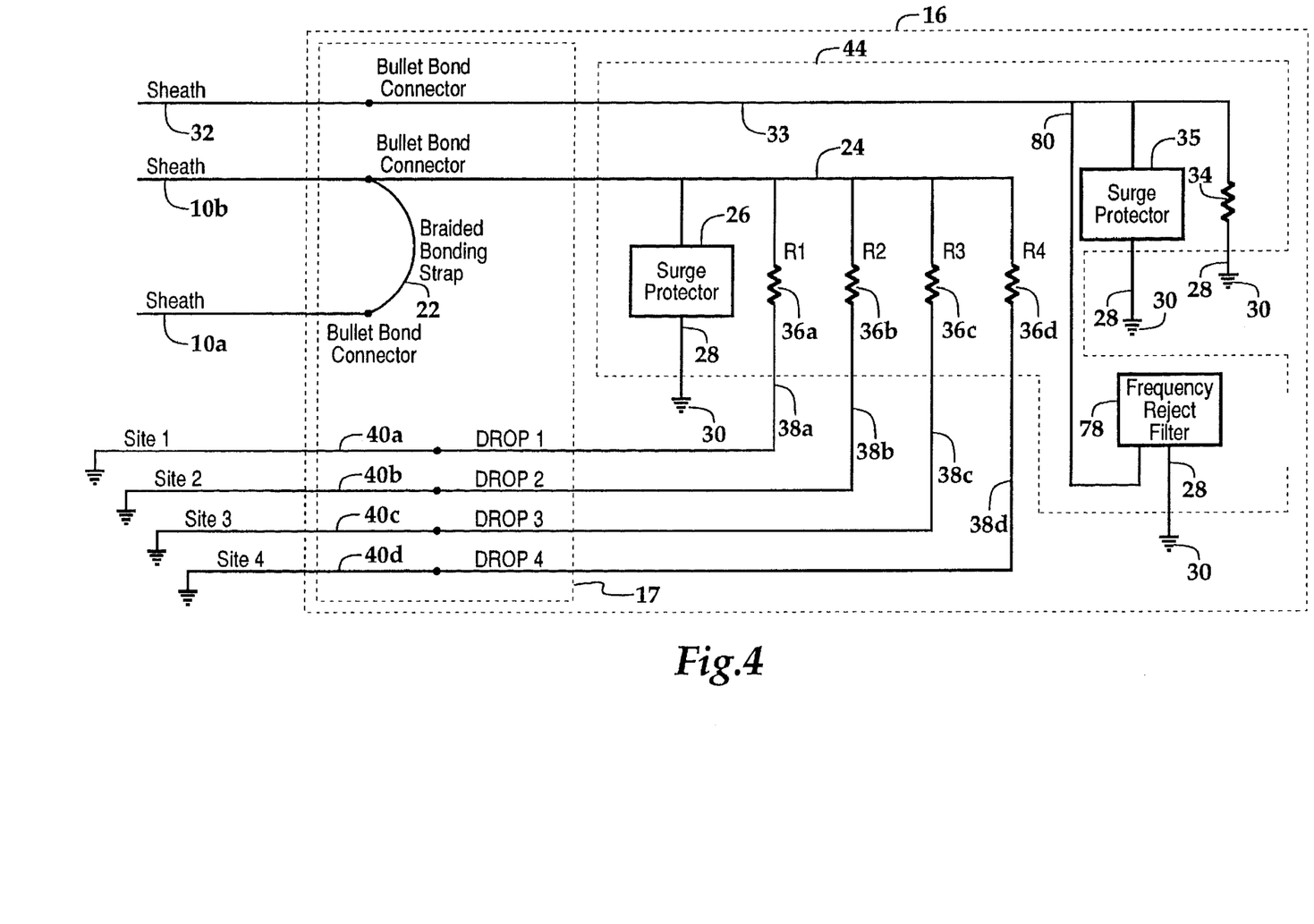
FIG. 4 is an electrical schematic for an alternate embodiment of a splice closure according to the invention.

Referring to FIG. 4, in some situations, a fiber backbone optic cable may run near an electrical power line carrying a high voltage, alternating current signal. Magnetic fields associated with the power line may induce a low frequency voltage on a conductive sheath of the fiber optic cable since it is not hard grounded. An alternate embodiment of splice closure 16 includes a frequency reject filter 78, shown connected to the conductive sheath 32 of a terminating backbone cable using a solid copper lead 80. The frequency reject filter is housed in enclosure 44 with the other electrical circuits. When the splice closure is fabricated, lead 80 is connected to the filter at one end and passed through an opening defined in end cap 46, terminating in the splice chamber for connection to the sheath of a cable. In the embodiment illustrated, the filter is connected to a terminating backbone cable. However, the frequency reject filter could instead be connected to the backbone cable 10. The frequency reject filter is tuned to pass to ground alternating current signals outside a narrow frequency range reserved for cable-locating signals. This range does not include the frequency of the high voltage power signals, which is usually 60 Hertz.

Figure 5:
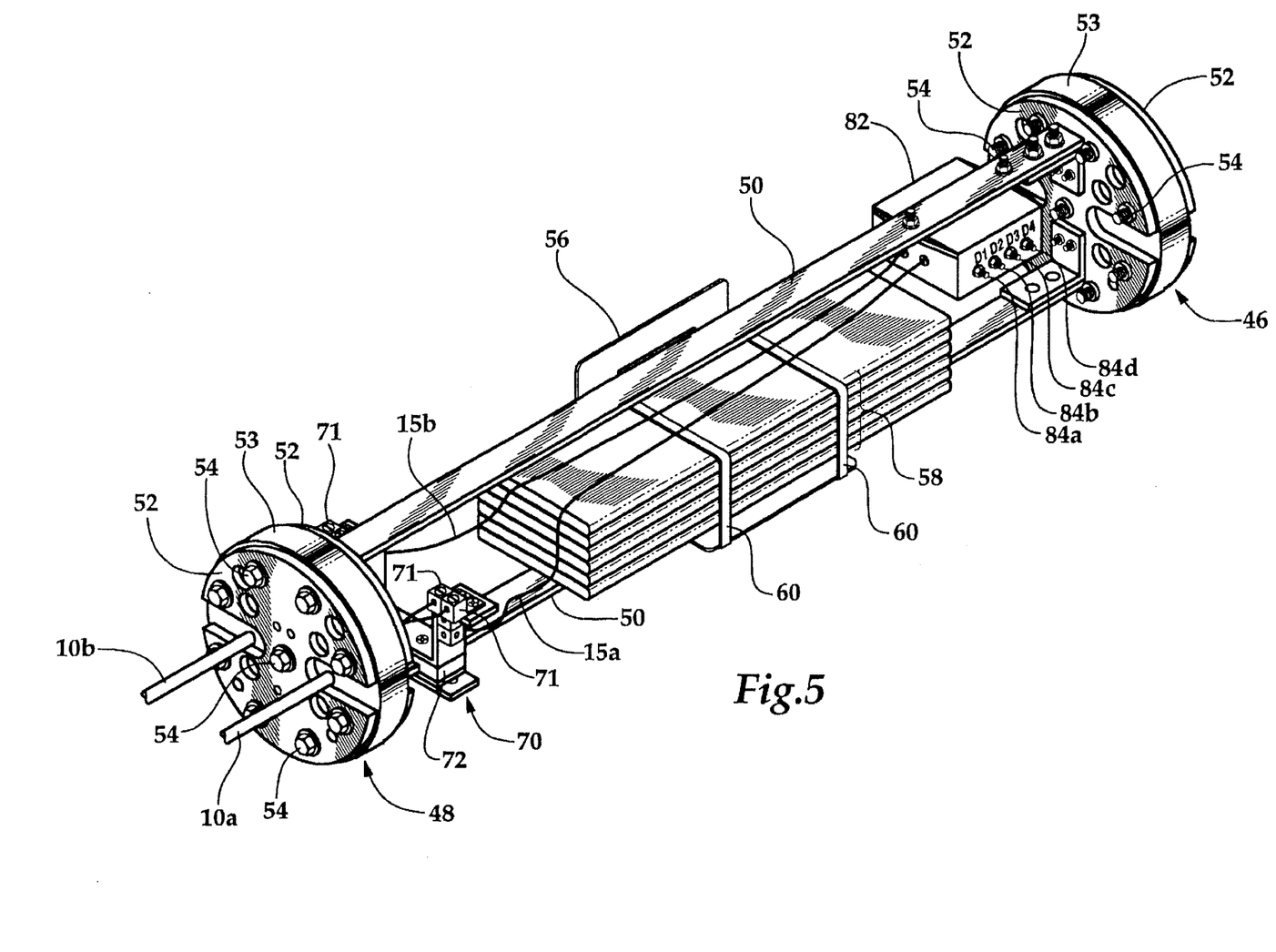
FIG. 5 is a perspective drawing of a splice closure according to the invention, showing an arrangement of components differing from the closure of FIG. 3.

Referring now to FIG. 5, rather than mounting the surge protector, resistor and filter in enclosure 44 outside the splice chamber as shown in FIGS. 1 and 3, these components are mounted within a sealed enclosure 82 and interconnected in the manner shown in the electrical schematics of either FIG. 3 or 5. The components shown in FIGS. 3 and 5 as being coupled to ground are connected to the enclosure 82, which is made of a conductive material, which in turn is grounded. The enclosure 82 is mounted on metal bar 50 inside the splice chamber in a manner which establishes an electrical connection between the enclosure and the bar. The bar 50 is electrically connected to end cap 46, which in turn is grounded by connecting a grounding wire (not shown) to one of the screws 54.

Conductive members 15a and 15b of backbone cables 10a and 10b enter the enclosure 82 through sealed openings 83. The optical fibers have been omitted for clearer illustration.

Inside enclosure 82, the conductive members are electrically connected to the surge protector and resistors in the manner illustrated by FIG. 3. External lugs 84a–84d are provided for electrically connecting trace wires of spur cables (not shown) to the resistors inside enclosure 82 according to the electrical schematic of FIG. 3. For example, trace wires 40a–40d shown in FIGS. 2 and 3 would be connected to these lugs.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the scope of the invention as set forth in the appended claims.

What is claimed is:

1. A fiber optic splice closure comprising:

an enclosure defining a splice chamber;

a surge suppressor electrically connected to means for grounding;

an electrical impedance means for causing a potential drop in a cable-locating signal;

a first lead having one end terminating within the splice chamber for connection to a conductive member of a fiber optic backbone cable and an opposite end electrically connected to the surge suppressor and to the electrical impedance means; and a second lead having one end electrically connected to the impedance means opposite the first lead and an opposite end terminating within the splice chamber for connection to a conductive member of a spur cable.

2. The fiber optic splice closure of claim 1 further including a second electrical impedance means for causing a potential drop in a cable-locating signal, the second impedance means having one side connected to the first lead and an opposite side connected to a third lead having a terminating end within the splice chamber for connection to a conductive member of a second spur cable.

3. The fiber optic splice closure of claim 1 in combination with a fiber optic backbone cable and a spur cable, the backbone cable having a conductive member connected to the first lead and the spur cable having a conductive member connected to the second lead.

4. The fiber optic splice closure of claim 1 further including a filter for passing to ground periodic signals having frequencies outside a predetermined range of frequencies for cable locating signals, the filter having one side coupled to the means for grounding and an opposite side connected to a third lead for electrical connection to a backbone cable.

5. The fiber optic splice closure of claim 1 further including a pull bracket for connecting to a strengthening member of a fiber optic backbone cable, the pull bracket including means for mounting the pull bracket to the closure within the splice chamber and means for electrically isolating the strengthening member from the closure.

6. The fiber optic splice closure of claim 1 wherein the surge suppressor and the impedance means are mounted within a second enclosure, the second enclosure being mounted to the first enclosure.

7. The fiber optic splice closure of claim 1, wherein:

the enclosure includes a cylindrical tube having first and second open ends, a first duct seal for sealing the first open end and a second duct seal for sealing the second open end, the first duct seal having openings defined therein for passage of a backbone cable and a spur cable; and the surge suppressor and the impedance means are mounted within a second enclosure, the second enclosure being mounted to the second duct seal.

8. The fiber optic splice closure of claim 7 further including a frame interconnecting the first and second duct seals to form a unitary unit with the second enclosure over which the cylindrical tube may slide.

9. The fiber optic splice closure of claim 1 wherein the surge supressor and the impedance means are mounted to the enclosure outside the splice chamber.

10. A fiber optic splice closure, comprising:

an enclosure defining a splice chamber;

a surge suppressor electrically connected to means for grounding;

a plurality of resistors;

a first lead having one end terminating within the splice chamber for connection to a conductive member of a fiber optic backbone cable and an opposite end electrically connected to the surge suppressor, opposite the means for grounding, and to one side of each of the plurality of resistors in parallel; and a plurality of drop leads, each of the plurality of drop leads being electrically connected to a respective one of the plurality of resistors on a side opposite the first lead and having a terminating end within the splice chamber for connection to a conductive member of a spur cable.

11. The fiber optic splice closure of claim 10, in combination with a fiber optic backbone cable and a plurality of spur cables, the fiber optic backbone cable having a conductive member for connection to the terminating end of the first lead and each of the plurality of spur cables being respectively connected to the terminating end of each of the plurality of drop leads.

12. The fiber optic splice closure of claim 10 further including a pull bracket for connecting to a strengthening member of a fiber optic backbone cable, the pull bracket including means for mounting the pull bracket within the splice chamber and means for electrically isolating the strengthening member from the closure.

13. The fiber optic splice closure of claim 10 further including a filter for passing periodic signals outside a predetermined range of frequencies for a cable locating signal, the filter having one side electrically connected to the means for grounding and an opposite side electrically connected to a fourth conductor, the fourth conductor having a terminating end within the splice chamber for connection to a backbone cable.

14. A fiber optic splice closure comprising:

a first enclosure including a splice chamber defined by a cylindrical tube having first and second open ends, a first duct seal for sealing the first open end and a second duct seal for sealing the second open end;

a second enclosure mounted to the first enclosure;

a surge suppressor mounted within the second enclosure, the surge suppressor electrically connected to means for grounding;

a plurality of resistors mounted within the second enclosure;

a first lead having one end terminating within the splice chamber for connection to a conductive member of a fiber optic backbone cable and an opposite end extending through an opening defined within one of the first and one of the second duct seals for electrical connection to the surge suppressor and to each of the plurality of resistors in parallel; and a plurality of drop leads, each of the plurality of drop leads being electrically connected to one of the plurality of resistors opposite the first lead, extending through openings defined in the second duct seal and having a terminating end within the splice chamber for connection to a conductive member of a spur cable.

15. The fiber optic splice closure of claim 14 further including a frame interconnecting the first and second duct seals, the second enclosure being mounted to the second duct seal.

16. The fiber optic splice closure of claim 15 further including a pull bracket for connecting to a strengthening member of a fiber optic backbone cable, the pull bracket including means for mounting the pull bracket to the frame and means for electrically isolating the strengthening member from the frame.

17. The fiber optic splice closure of claim 14 further including a filter mounted in the second enclosure having one side connected to the means for grounding and an opposite side connected to a fourth conductor, the fourth conductor extending through an opening defined in the second duct seal and having a terminating end within the splice chamber for connection to a backbone cable.

18. A fiber optic splice closure comprising:

an enclosure defining a fiber optic splice chamber and a seal for sealing the chamber;

a surge suppressor commonly mounted on a frame with the sealed enclosure, one side of the surge suppressor connected to means for grounding;

an electrical impedance means commonly mounted with the surge suppressor for causing a potential drop in a cable-locating signal;

a first lead having a free end for connection to a conductive member of a fiber optic backbone cable and an opposite end connected to the surge suppressor and to the electrical impedance means; and a second lead having a free end for connection to a conductive member of a spur cable and an opposite end connected to the impedance means opposite the first lead.

19. The fiber optic splice closure of claim 18 further including a second electrical impedance means for causing a potential drop in a cable-locating signal, the second impedance means having one side connected to the first lead and an opposite side connected to a third lead having a free end for connection to a conductive member of a second spur cable.

20. The fiber optic splice closure of claim 18 in combination with a fiber optic backbone cable and a spur cable, the backbone cable having a conductive member connected to the first lead and the spur cable having a conductive member connected to the second lead.

21. The fiber optic splice closure of claim 18 further including a filter for passing to ground periodic signals having frequencies outside a predetermined range of frequencies for cable locating signals, the filter having one side coupled to the means for grounding and an opposite side connected to a third lead for electrical connection to a backbone cable.

* * * * *